United States Patent [19]

Takano et al.

[11] 4,413,977
[45] Nov. 8, 1983

[54] APPARATUS FOR TAKING MATERIAL TO BE TREATED INTO AND OUT OF HIGH PRESSURE TANK

[75] Inventors: Motoharu Takano, Machida; Minoru Hoshino, Kawaguchi, both of Japan

[73] Assignee: Q.P. Corporation, Tokyo, Japan

[21] Appl. No.: 328,693

[22] Filed: Dec. 8, 1981

[30] Foreign Application Priority Data

Jan. 9, 1981 [JP] Japan ................................. 56-1892
May 13, 1981 [JP] Japan ................................ 56-71885

[51] Int. Cl.³ ........................ F27D 19/00; A45B 9/00
[52] U.S. Cl. ...................................... 432/56; 34/242; 134/71; 134/75; 134/154; 134/183; 414/292; 432/242
[58] Field of Search ............... 432/56, 242; 414/290, 414/292; 134/71, 75, 154, 182, 183; 34/242

[56] References Cited

U.S. PATENT DOCUMENTS 1,979,697 11/1934 Maring ............................... 432/242
3,128,963 4/1964 Erkes ................................. 414/290
3,487,960 1/1970 Evers ................................. 414/292

FOREIGN PATENT DOCUMENTS 2339135 2/1975 Fed. Rep. of Germany ...... 414/292

Primary Examiner—John J. Camby
Attorney, Agent, or Firm—Browdy & Neimark

[57] ABSTRACT

An apparatus for taking a material to be treated into and out of a treating high pressure tank such as a heating sterilization tank comprises a conveyor passage interconnecting the high pressure tank and a water tank and constituted by two or more partially cylindrical casings connected in a side-by-side relation and each rotatably accomodating a rotary closure member having 2 to 6 blades adapted to make a sliding contact with the inner peripheral surface of the casing. Due to a specific phase difference between the blades of adjacent rotary closure members, the conveyor passage is always closed by some of the blades. A pair of endless conveyor chains, carrying a plurality of treating vessels accomodating the material, are adapted to run along both side surfaces of the conveyor passage through the high pressure tank and the water tank in a timed relation to the rotation of the rotary closure members. Means are provided for returning the leaked liquid back to the high pressure tank from the water tank.

4 Claims, 7 Drawing Figures

APPARATUS FOR TAKING MATERIAL TO BE TREATED INTO AND OUT OF HIGH PRESSURE TANK

BACKGROUND OF THE INVENTION

The present invention relates to an improvement in the apparatus for taking a material to be treated into and out of a treating tank having a high internal pressure.

Japanese Patent Publication No. 3696/1978 discloses an apparatus for efficiently heating and sterilizing foodstuffs or the like material continuously in a high pressure tank. This known apparatus has an entrance/exit passage sleeve disposed beneath the liquid level in the high pressure tank. The material to be treated is taken into or out of the tank while the inside of the passage sleeve is divided into a plurality of sections by closure members which are integral with or separate from treating vessels supported by a conveyor chain.

This known apparatus, however, has various drawbacks. Namely, a large driving power is required because the high internal pressure of the tank directly acts on the treating vessels and closure members dividing the entrance/exit passage sleeve. In addition, the treating vessels and closure members have to be constructed to withstand the high pressure. This in turn increases the loss of heat in the cooling step and, hence, results in a lowered thermal efficiency.

SUMMARY OF THE INVENTION

The present invention aims as its major object at providing an apparatus capable of overcoming the above-described problems of the prior art.

Accordingly, an object of the invention is to provide a high pressure tank in which the direct contact between the pressurized liquid in the tank and the normal pressure portion is avoided and the material to be treated is continuously taken into and out of the tank to permit an efficient heat sterilization while minimizing the escape of the pressurized liquid from the high pressure tank.

Another object of the invention is to provide a high pressure tank in which the high internal pressure of the tank is prevented from directly acting on the treating vessels accomodating the material and on the conveyor of the vessels to reduce the required driving power and to permit a reduction of strength of the conveyor and vessels, while simplifying the construction and reducing the weight of the same to afford an efficient convey of the material into and out of the high pressure tank.

Still another object of the invention is to provide a high pressure tank in which a rotary closure member mounted in a cylindrical casing disposed in the convey passage is adapted to rotate while making an airtight close sliding contact with the surface of the casing to minimize the wear of the sliding part to ensure a longer life of the passage as well as the sliding part.

A further object of the invention is to provide a high pressure tank in which, even when the sliding part of the rotary closure member has become worn out, the apparatus as a whole becomes usable simply by a replacement of the worn sliding part with a spare one.

These and other objects, as well as advantageous features of the invention will become clear from the following description of the preferred embodiments taken in conjunction with the accompanying drawings.

DESCRIPTION OF THE PREFERRED EMBODIMENTS

Figure 1:
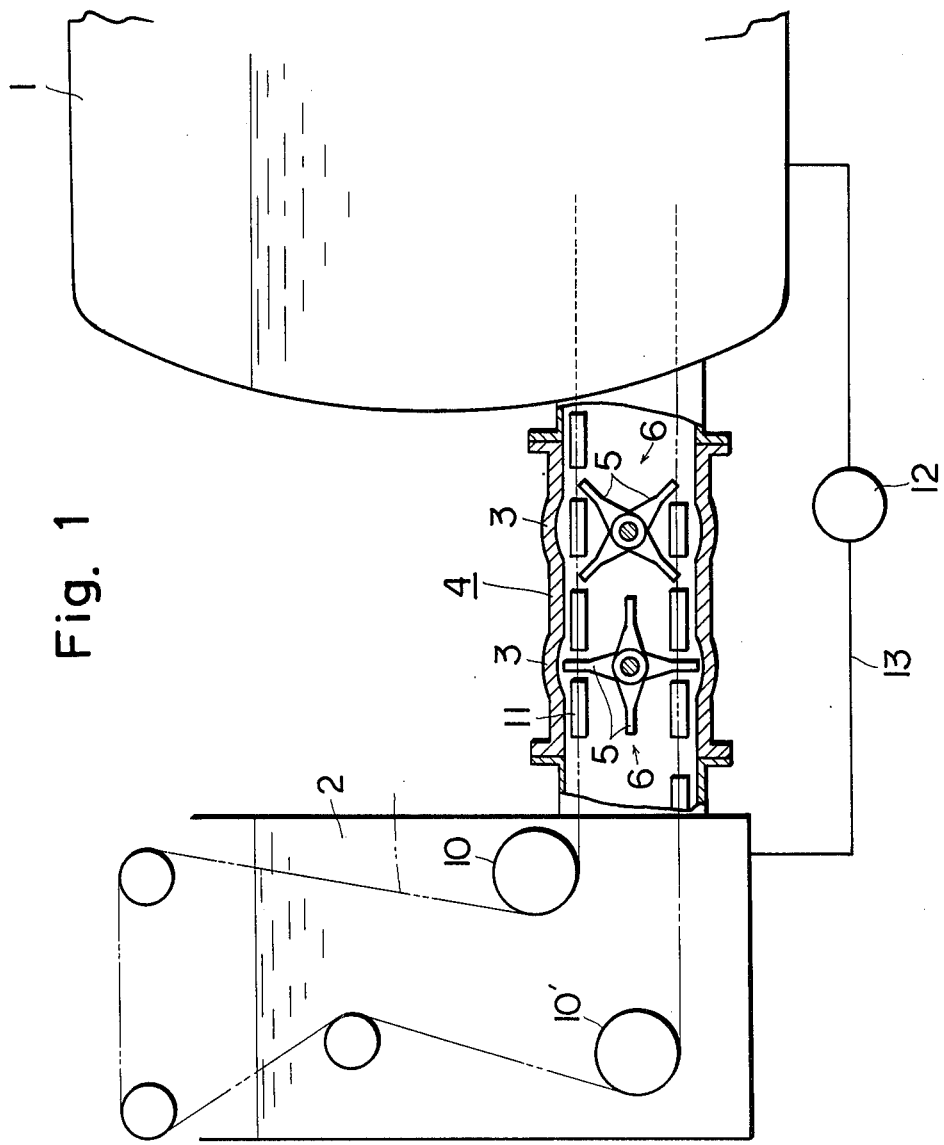
FIG. 1 is a partly-sectioned front elevational view of an apparatus in accordance with an embodiment of the invention.
Figure 2:
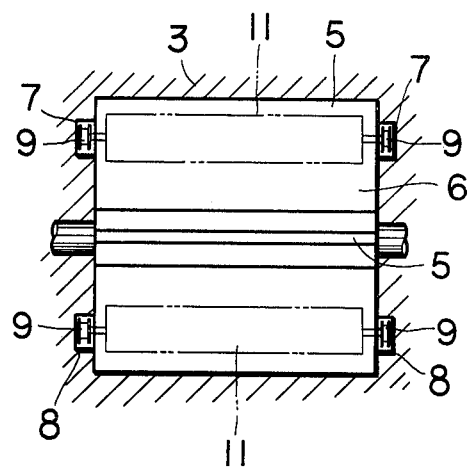
FIG. 2 is a vertical sectional view of a conveyor passage of the apparatus shown in FIG. 1.
Figure 7:
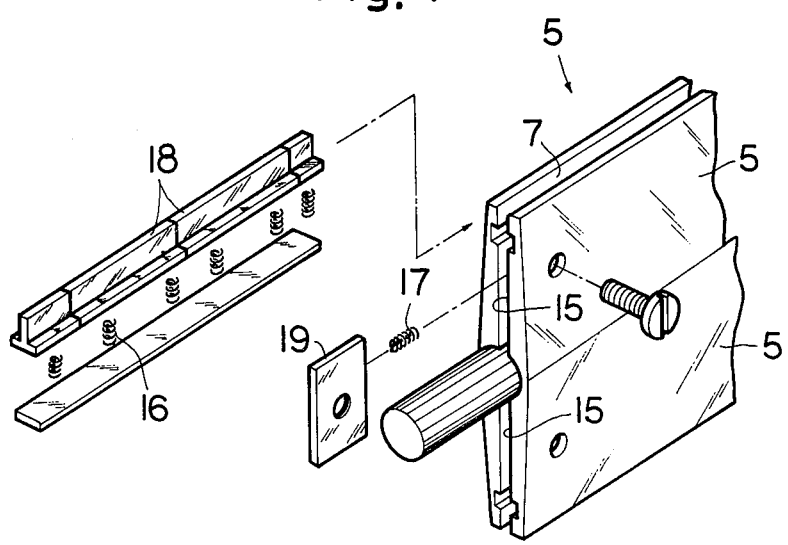
FIG. 7 is an exploded perspective view of an essential portion of the conveyor passage shown in FIG. 4.
Figure 3:
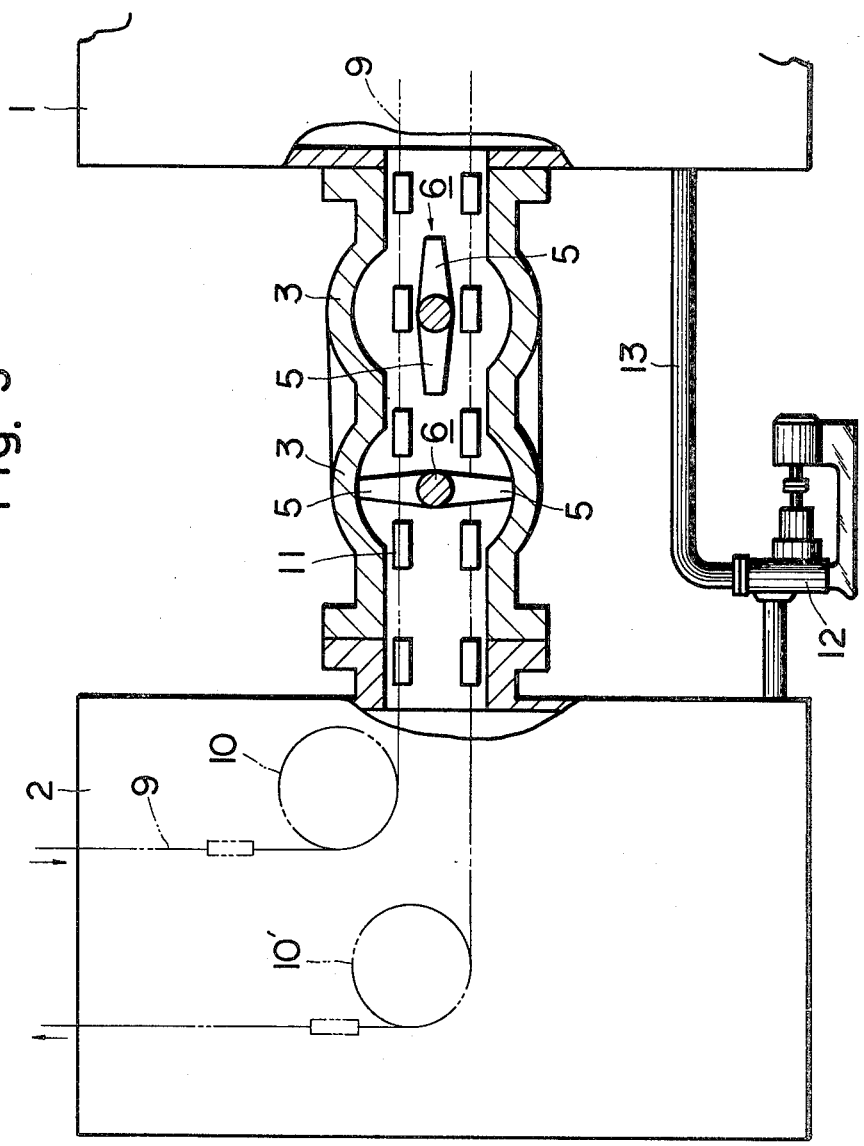
FIG. 3 is a partly-sectioned front elevational view of another embodiment of the invention.
Figure 4:
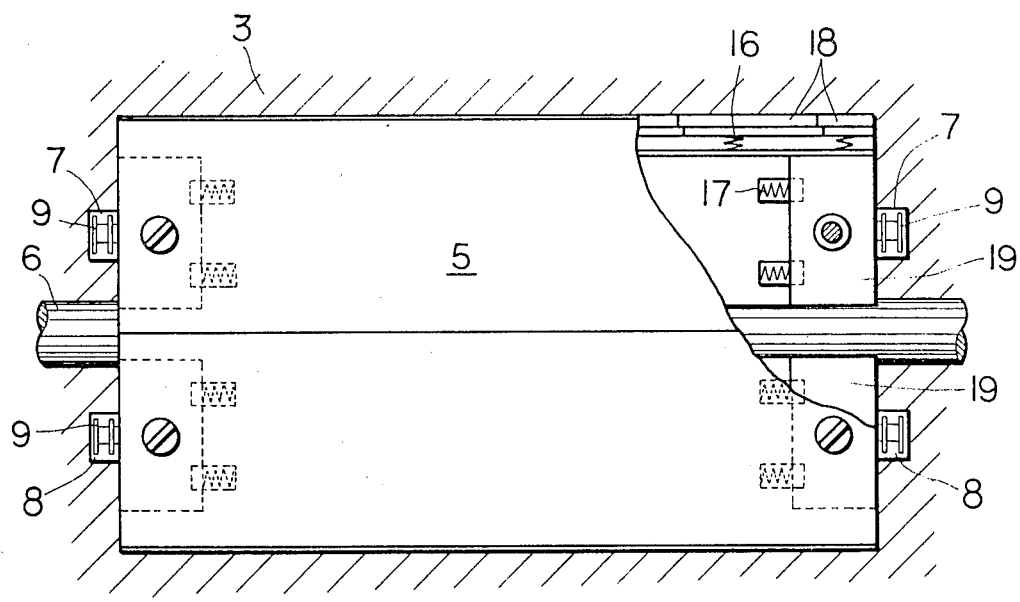
FIG. 4 is a longitudinal sectional view of a conveyor passage with a part thereof being removed.
Figure 5:
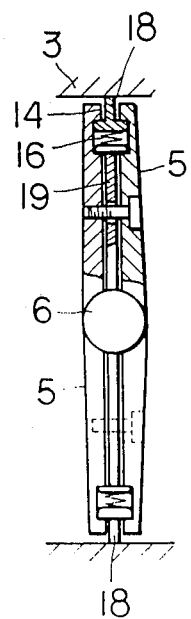
FIG. 5 is a vertical sectional front elevational view of the conveyor passage shown in FIG. 4.
Figure 6:
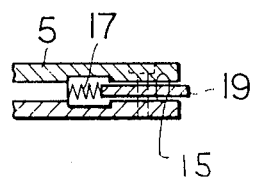
FIG. 6 is a sectional plan view of a part of the conveyor passage shown in FIG. 4.

Preferred embodiments of the invention will be described hereinunder with reference to the accompanying drawings.

The interior of a high pressure tank 1 accomodating a liquid such as a cooling liquid or a heating sterilization liquid is communicated with a water tank 2 opened at its upper end, through a conveyor passage 4 constituted by a pair of partially cylindrical casings 3, 3 disposed in parallel with each other at a level below the liquid surface. Each casing 3 rotatably accomodates a rotary closure member having form or more equi-spaced blades 5 adapted to make a sliding contact with the inner surface of the casing. These rotary members 6,6 are rotatable in the same direction (clockwise direction in the illustrated embodiment). The angular distance or the phase differential between two adjacent blades 5 of two rotary closure members 6,6 is selected to be $180/n°$, where n represents the number of blades 5 in each rotary closure member 6.

Namely, the angular distance is 90° in the case where each rotary closure member has 2(two) blades and 60° when the same has three blades. Thus, in the illustrated embodiment having rotary closure members each having 4(four) blades, the phase difference is 45°. The arrangement is such that, while the blades 5 of one of the two rotary closure members are held in contact with the casing wall to close the conveyor passage 4, the blades 5 of the other rotary closure member are positioned out of contact with the casing wall to open the conveyor passage 4.

Upper grooves 7,7 and lower grooves 8,8 are formed in the upper and lower portions of both inner surfaces of the conveyor passage 4 so as to oppose to each other. A pair of conveyor chains 9,9 engaging sprockets 10 in the water tank 2 run from the latter into the high pressure tank 1 through the upper grooves 7,7 and, after making a turn in the high pressure tank 1, come out of the latter through the lower grooves 8,8. The conveyor chains then extend to the upper side of the water tank 2 via sprockets 10' in the water tank 2 and then move again into the pressure tank 1. Thus, the pair of the conveyor chains are stretched in an endless manner.

A plurality of porous treating vessels 11 accomodating the material to be treated are held between two endless conveyor belts at a constant pitch, i.e. equally spaced apart. The conveyor chains 9,9 are adapted to run in synchronization with the rotation of the rotary closure members 6 so as not to contact the blades 5 of the latter.

The bottom of the water tank is connected via a pipe 13 having a pump 12 to the pressure tank 1, so that the liquid which has escaped to the water tank 2 can be returned to the high-pressure tank 1.

In operation of the apparatus of the invention having the described construction, the rotary closure members 6,6 are rotated clockwise simultaneously with the convey of the treating vessels 11 containing the material to be treated from the water tank 2 by means of the pair of conveyor chains. In consequence, the conveyor passage 6 is alternatingly opened and closed due to the phase difference between the blades 5 of the rotary closure members 6,6. The blades 5 of the rotary closure member 6 adjacent to the water tank 2 shown in FIG. 1 are rotated from the closing position where they close the conveyor passage 4 to the opening position so that the treating vessel is conveyed through the upper portion of the conveyor passage 4 to the position between two rotary closure members 6,6. At the same time, the blades 5 of the rotary closure member 6 adjacent to the high pressure tank 1 are rotated from the opening position to the closing position so that the treating vessel 11 held between these blades 5,5 is fed into the high pressure tank 1.

On the other hand, at the lower portion of the conveyor passage 4, the treating vessels 11 after heating sterilization in the high pressure tank 1 are successively conveyed in the reverse direction due to the phase difference of rotation of blades of the two rotary closure members 6,6 in combination with the returning running of the conveyor chains 9,9, back into the water tank 2 via the space between rotary closure members 6,6.

In this case, therefore, some of the liquid under high pressure leaks from the high pressure tank 1 into the water tank due to intermittent opening of the conveyor passage 4 and through the grooves 7,7 and 8,8. The leaking liquid, however, is fed back again to the high pressure tank 1.

FIGS. 3 to 7 in combination show another embodiment in which each rotary closure member 6 is provided with two blades and is arranged to attain a higher tightness or closeness of sliding contact between the blades and and the inner surface of the casing 3,3.

Namely, in this embodiment, each blade 5 is provided at its outer edge and both side edges with grooves 14 and 15, respectively. These grooves 14,15 are loaded with slide plates 18,19 made from a wear resistant material such as teflon, roulon and the like biased radially outwardly or laterally by respective springs 16 and 17. These slide plates 18,19 are adapted to make sliding contact with the inner surfaces of each casing 3 to ensure a higher degree of liquid tightness.

In the apparatus of the invention, the pitch of the treating vessels 11 can be increased as the number of the blades 5 of each rotary closure member 6 is increased to attain a higher efficiency of the treatment. However, the increased number of blades inconveniently requires a larger distance between the path of the treating vessel and the center of the cylindrical casing which in turn requires a greater diameter of the conveyor passage 4.

From this point of view, the number of the blades of each rotary closure member is preferably selected to fall between 2 and 6.

Although in the described embodiment, the conveyor passage 4 is constituted by two cylindrical casing arranged in a side-by-side relation, this is not exclusive and the conveyor passage 4 may be constituted by three or more cylindrical casings arranged in the side-by-side relation.

It is also possible to select the pitch of the cylindrical casings 3,3, i.e. increase the distance between axes of adjacent cylindrical casings, to accomodate two or more treating vessels 11 between two adjacent closure members 6,6.

What is claimed is:

1. An apparatus for taking a material to be treated into and out of a treating high pressure tank, comprising:

wall means defining a conveyor passage connecting an end of a high-pressure treating tank containing a treating liquid and a portion of water tank below the water level in said water tank, said conveyor passage being composed of a plurality of cylindrical casings arranged in a side-by-side relation with the axes of said casings extending widthwise of said passage;

a rotary closure member having two or more blades accommodated rotatably within each casing coaxial therewith, the length of each blade measured from the axis being generally equal to the radius of the casing such that each blade make a sliding contact with the inner surface of the associated casing, said rotary closure members being adapted to rotate in the same direction, the blades of adjacent rotary closure members being arranged at a phase difference of 180/n° (n being number of blades of each rotary closure member) so that said conveyor passage is always closed by some of said blades of rotary closure members;

a pair of conveyor chains carrying a plurality of treating vessels at a constant pitch and disposed along both side surfaces of said conveyor passages to run through said high pressure tank and said water tank in timed relation to the rotation of said rotary closure members so that said vessels pass between said rotating blades in each casing and between adjacent casings; and means mounted in said water tank to return leaked treating liquid from said water tank to said high pressure tank.

2. An apparatus for taking a material to be treated into and out of a treating high pressure tank, comprising:

wall means defining a conveyor passage connecting an end of a high-pressure treating tank containing a liquid and a portion of a water tank below the water level in said water tank, said conveyor passage being composed of a plurality of cylindrical casings arranged in a side-by-side relation;

a rotary closure member having two or more blades accommodated rotatably within each cylindrical casing and coaxial therewith, each blade having a radially extended outer edge and side edges and being provided at said outer edge and side edges with slide plates biased by springs outwardly and laterally to make liquid-tight sliding contact with confronting surfaces of the associated cylindrical casing, said rotary closure members being adapted to rotate in the same direction, said blades of adjacent rotary closure members being arranged at a phase difference of 180/n° (n being the number of blades held by each rotary member,) so that said conveyor passage is always closed by some of said blades of said rotary closure members;

a pair of conveyor chains disposed along both side surfaces of said conveyor passage and carrying a plurality of equally spaced treating vessels, said conveyor chains being adapted to run through said high pressure tank and said water tank in timed relation to the rotation of said rotary closure members so that said vessels pass between said rotating blades in each casing and between adjacent casings; and means provided in said water tank to return leaked liquid from said water tank to said high pressure tank.

3. An apparatus for taking a material to be treated into and out of a treating high pressure tank as claimed in claim 1 or 2, wherein said conveyor passage is composed of two cylindrical cases arranged in a side-by-side relation and each cylindrical casing accomdates said rotary closure member having 2 to 6 (two to six) blades.

4. An apparatus for taking a material to be treated into and out of a treating high pressure tank as claimed in claim 2, wherein each blade of each rotary closure member is provided at its radially extend outer edge and side edges with grooves for receiving said slide plates made of a wear resistant material, said slide plates being biased radially outwardly or laterally by said springs acting on inner ends of respective slide plates into liquid-tight contact with the inner surfaces of said cylindrical casing.

* * * * *